(12) United States Patent
Shozaki et al.

(10) Patent No.: US 7,701,601 B2
(45) Date of Patent: Apr. 20, 2010

(54) DATA OUTPUT APPARATUS PERFORMING DATA OUTPUT AFTER RECEPTION OF AUTHENTICATION DATA FROM PORTABLE TERMINAL

(75) Inventors: Toshiya Shozaki, Neyagawa (JP); Kenichi Takahashi, Sennan-gun (JP); Kaitaku Ozawa, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1601 days.

(21) Appl. No.: 10/921,320

(22) Filed: Aug. 19, 2004

(65) Prior Publication Data

US 2005/0253889 A1 Nov. 17, 2005

(30) Foreign Application Priority Data

May 14, 2004 (JP) ............................. 2004-145090

(51) Int. Cl.
G06F 3/12 (2006.01)
(52) U.S. Cl. ...................................... 358/1.15; 358/1.1
(58) Field of Classification Search ................ 358/1.15, 358/1.1
See application file for complete search history.

(56) References Cited

U.S. PATENT DOCUMENTS 5,673,373 A * 9/1997 Nosaki et al. ............... 358/1.15
6,751,732 B2 * 6/2004 Strobel et al. ............... 713/176
2005/0254714 A1 * 11/2005 Anne .......................... 382/233

FOREIGN PATENT DOCUMENTS

| JP | 2000-207301 | | 7/2000 |
| JP | 2002-163093 | | 6/2002 |
| JP | 2002-352190 | | 12/2002 |
| JP | 2003-128544 | * | 5/2003 |
| JP | 2003-169187 | | 6/2003 |

* cited by examiner

Primary Examiner—King Y Poon
Assistant Examiner—Lawrence E Wills
(74) Attorney, Agent, or Firm—Buchanan Ingersoll & Rooney PC

(57) ABSTRACT

A portable terminal user uses a portable terminal so as to select data to be printed among data in a server as well as an MFP from which the data is to be printed out. The server creates authentication data and transmits the authentication data to the selected MFP. The MFP displays the authentication data. The portable terminal acquires the authentication data through picture taking, and transmits the acquired data to the server. The server compares the created authentication data with the data transmitted from the portable terminal. If they match, print data corresponding to the authentication data is transmitted to the MFP, whereby the MFP performs printing. With such a configuration, an image output system attaining excellent usability for the user and improved security can be provided.

23 Claims, 9 Drawing Sheets

DATA OUTPUT APPARATUS PERFORMING DATA OUTPUT AFTER RECEPTION OF AUTHENTICATION DATA FROM PORTABLE TERMINAL

This application is based on the Japanese Patent Application No. 2004-145090 filed with the Japan Patent Office on May 14, 2004, the entire content of which is hereby incorporated by reference.

BACKGROUND OF THE INVENTION

1. Field of the Invention

The present invention relates to a data output system and a data output apparatus, and more particularly to a data output system and a data output apparatus capable of transrmitting and printing a desired data among stored data.

2. Description of the Related Art

A device attaining a print function such as an MFP (Multi Function Peripherals) or a printer has conventionally been used. Image data is stored in a server, from which data is downloaded and printed out by the MFP or the like.

When data in a server is to be printed at a remote location, a password is set for the data, for example.

As to a technology for data transmission, Japanese Laid-Open Patent Publication No. 2003-169187 discloses a technique to obtain a device address of a portable telephone, by indicating the device address thereof by a barcode for display on a liquid crystal display, picturing the bar code with a camera, and processing image information thereof in a CPU in the camera.

Japanese Laid-Open Patent Publication No. 2002-352190 discloses such a technique that a portable telephone causes image data of an object pictured by a camera to be displayed on a display, a range of character area contained in the image data is designated by using a key input portion, and the image data and information on the designated range of character area is transmitted to an image processing server through a communication network. An image processing server recognizes characters contained in the image data received from the portable telephone with its internal character recognition function, and converts the characters into text data, which is in turn transmitted to the portable telephone. The portable telephone receives the text data transmitted from the image processing server.

Japanese Laid-Open Patent Publication No. 2000-207301 discloses such a technique that a PC (personal computer) is equipped with a digital camera, with which an image including textual information is picked up, the textual information is cut out from the picked up image and thereafter subjected to OCR (optical character reading), and a mail address is recognized if there is @ mark found. When a mail address is recognized, a message "Do you want to designate this address as a destination?" is displayed. If an OK key is pressed, mailer software starts up and a screen for new mail transmission is shown. After a desired text is input, the mail is transmitted:

On the other hand, when data from the server is to be printed out from the conventional MFP, a security setting or a user operation has been complicated. In particular, when data is to be output from an MFP installed in a convenience store, for example, it is necessary to prohibit a third party from printing data. In contrast, if a complicated operation such as input of a password is required, it is less convenient for a user.

SUMMARY OF THE INVENTION

The present invention was made to solve the above-described problems. An object of the present invention is to provide a data output system and a data output apparatus attaining excellent usability for a user and improved security.

In order to achieve the object above, according to one aspect of the present invention, a data output system is constituted of a portable terminal that can be carried by a user, a data output apparatus capable of storing data and transmitting the data to the outside, and a data print apparatus capable of printing data. The portable terminal includes a selector selecting desired data among data stored in the data output apparatus as well as a data print apparatus for printing the desired data, and a selection result transmitter transmitting a selection result to the data output apparatus. The data output apparatus includes an authentication data transmitter transmitting authentication data to the selected data print apparatus based on the selection result transmitted from the selection result transmitter in the portable terminal. The data print apparatus includes a display displaying the authentication data transmitted from the authentication data transmitter in the data output apparatus. The portable terminal further includes an acquirer acquiring the authentication data displayed on the display of the data print apparatus through picture taking, and an authentication data transmitter transmitting the acquired authentication data to the data output apparatus. The data output apparatus includes a comparison unit comparing the authentication data transmitted from the authentication data transmitter in the portable terminal with the authentication data transmitted from the authentication data transmitter in the data output apparatus, and a data transmitter transmitting the data selected by the portable terminal to the data print apparatus if a result of comparison by the comparison unit shows match. The data print apparatus further includes a print unit printing the data transmitted from the data transmitter in the data output apparatus.

According to the present invention, a data output system and a data output apparatus attaining excellent usability for a user and improved security can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
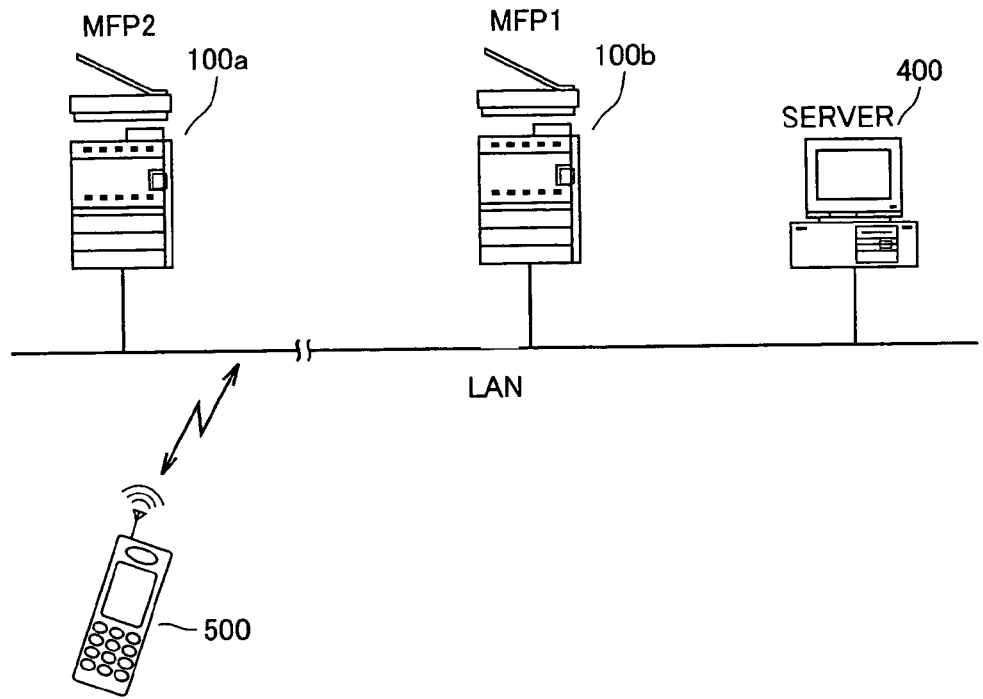
FIG. 1 shows a configuration of a data output system including a data output apparatus in one embodiment of the present invention.

Referring to FIG. 1, a data output system is constituted of MFPs (or printers) 100a, 100b serving as data print apparatuses connected to networks respectively, a server 400 serving as a data output apparatus, and a portable terminal 500 such as a portable telephone or a PDA that can be carried by a user.

Here, connection among MFPs 100a, 10b, server 400 and portable terminal 500 can be established by LAN, WAN, the internet, a leased circuit, radio communication, or the like. In addition, MFPs 100a, 100b and server 400 may be provided on the same premises or on different premises. For example, server 400 may be provided in an administration center, MFP 100a may be provided in a convenience store A, and MFP 100b may be provided in a convenience store B.

Server 400 stores electronic data that can be read and printed out from MFPs 100a, 100b, and the user of portable terminal 500 can view the data on a display screen of portable terminal 500. If the user finds data to be printed out, the user inputs an instruction to select that data to portable terminal 500. At the same time, the user inputs to portable terminal 500 an instruction to select an MFP from which the data is to be output.

These input instructions are sent to server 400. In response to this, server 400 creates authentication data for printing. The authentication data is sent to the selected MFP (here, it is assumed as MFP 100a). The authentication data is stored in and displayed on MFP 100a.

The user goes to designated MFP 100a, and takes into portable terminal 500 the authentication data stored in or displayed on MFP 100a. When the taken-in authentication data is transmitted to server 400, the server determines whether the authentication data input from portable terminal 500 matches the authentication data transmitted to MFP 100a. If they match, server 400 transmits print data to MFP 100a. Then, printing of data desired by the user is carried out on MFP 100a. The user can output the data stored in the server at any place.

Figure 2:
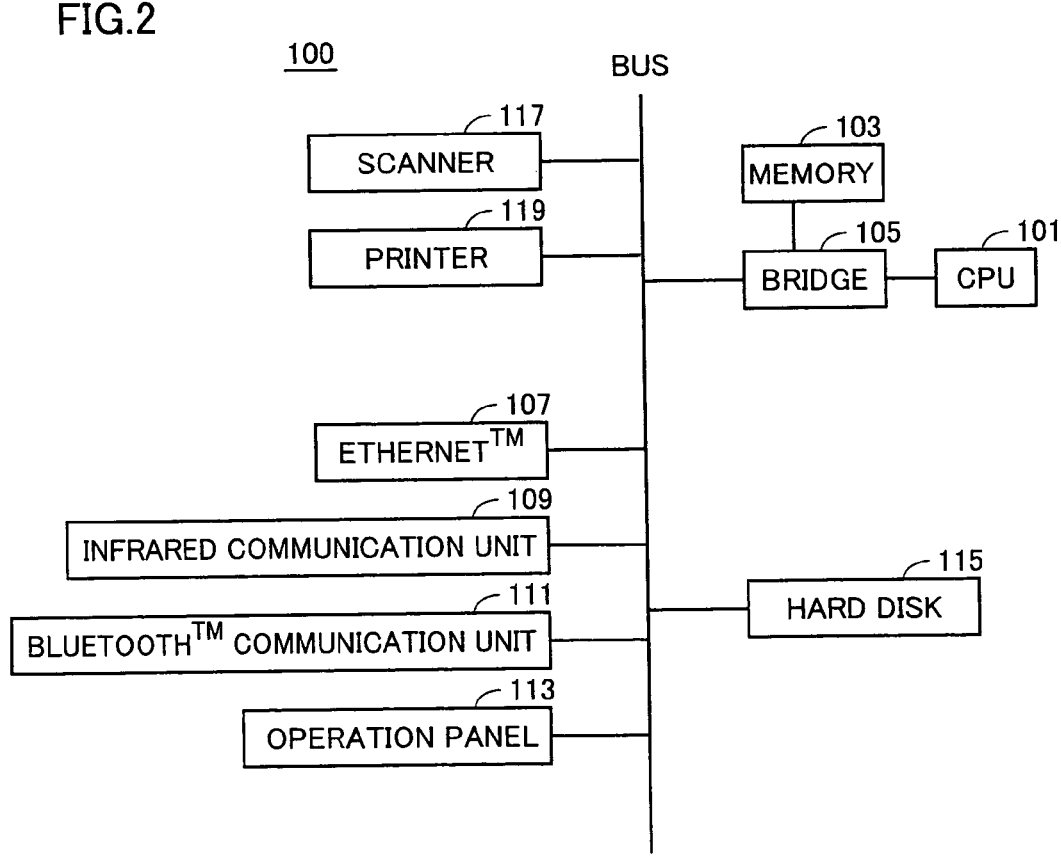
FIG. 2 is a block diagram showing a configuration of one MFP 100a, 100b in FIG. 1.

FIG. 2 is a block diagram showing a configuration of one MFP 100a, 100b in FIG. 1. MFP (Multi-Function Peripherals) 100 is a multi-function apparatus attaining a scanner function, a copy function, a facsimile function, a printer function, and the like.

Referring to FIG. 2, MFP 100 includes a CPU 101 for overall control of the apparatus, a memory 103 recording a program or a constant, a bridge 105 connected to CPU 101 and memory 103 and transmitting/receiving data to/from a bus, an interface 107 for connection to a network (here, Ethernet™ is assumed), an infrared communication unit 109 for infrared communication with portable terminal 500, a Bluetooth™ communication unit 111 for radio communication with portable terminal 500, an operation panel 113 for displaying the authentication data or accepting an input from the user, a hard disk 115 storing data, a scanner 117 reading image data, and a printer 119 printing out data. Blocks are connected to each other by a bus.

Figure 3:
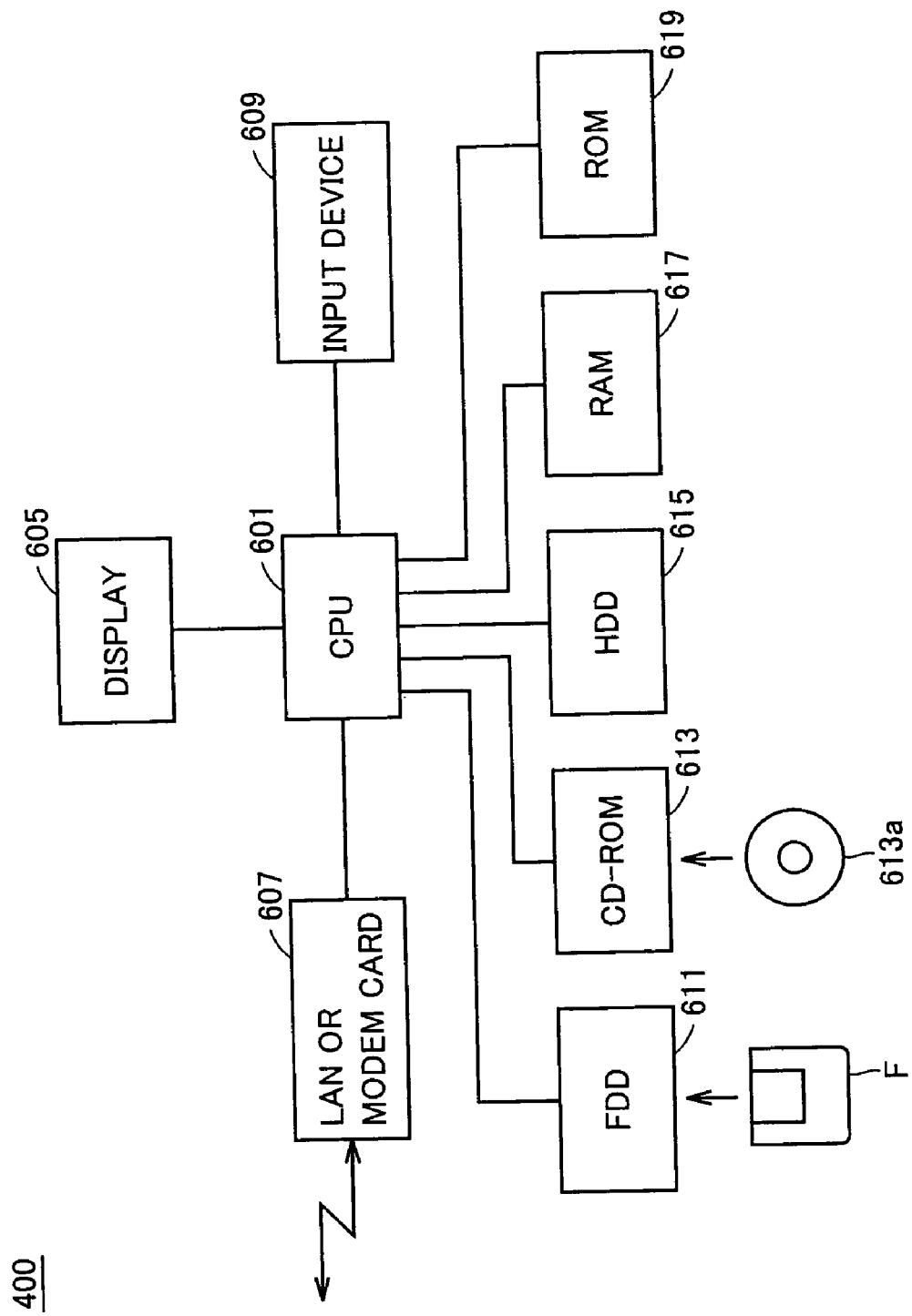
FIG. 3 is a block diagram showing a hardware configuration of a server 400 in FIG. 1.

FIG. 3 is a block diagram showing a hardware configuration of server 400 in FIG. 1, which is implemented by a general personal computer.

Referring to FIG. 3, server 400 includes a CPU 601 for overall control of the apparatus, a display 605, an LAN (local area network) card 607 (or a modem card) for connection to the network or communication with the outside, an input device 609 implemented by a keyboard or a mouse, a flexible disc drive 611, a CD-ROM drive 613, a hard disk drive 615, an RAM 617, and an ROM 619.

Data such as a program recorded on a flexible disc F can be read by means of flexible disc drive 611, while data such as a program recorded on a CD-ROM 613a can be read by means of CD-ROM drive 613.

Figure 4:
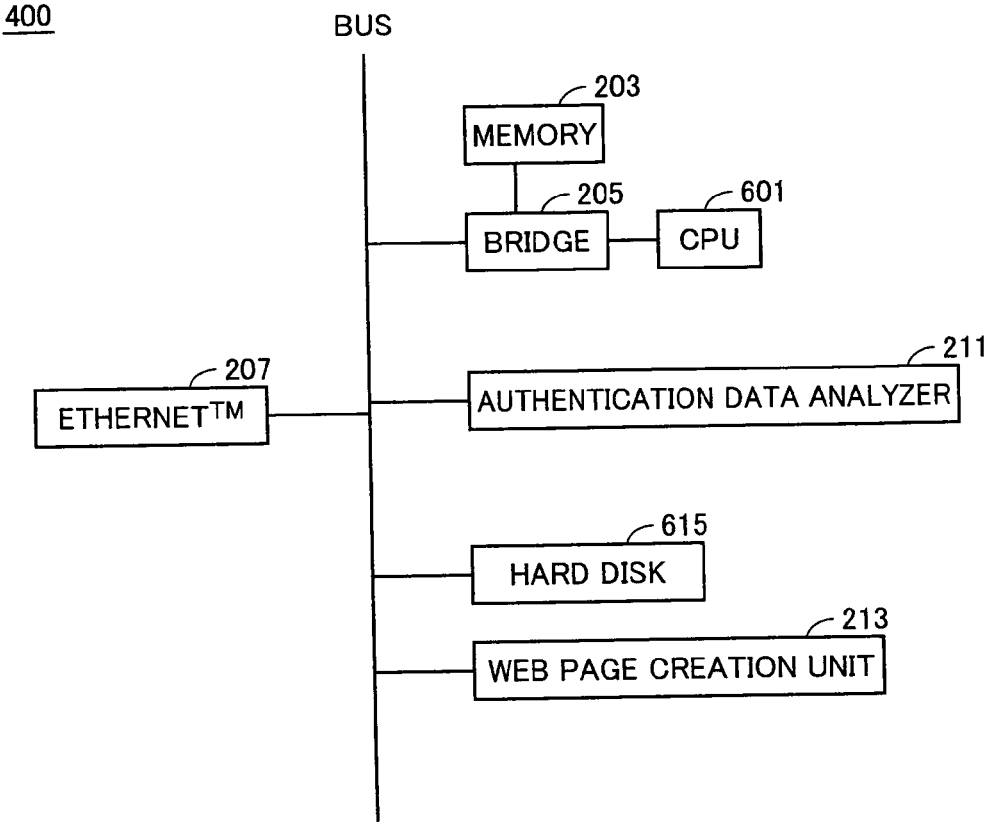
FIG. 4 is a functional block diagram of server 400.

FIG. 4 is a functional block diagram of server 400.

Referring to FIG. 4, server 400 includes CPU 601 for overall control of the apparatus, a memory 203 recording a program or a constant, a bridge 205 connected to CPU 601 and memory 203 and transmitting/receiving data to/from a bus, an interface 207 for connection to a network (here, Ethernet™ is assumed), an authentication data analyzer 211 for analyzing the authentication data, hard disk 615 storing data, and a Web page creation unit 213 creating a Web page for displaying a list of data in the hard disk.

Figure 5:
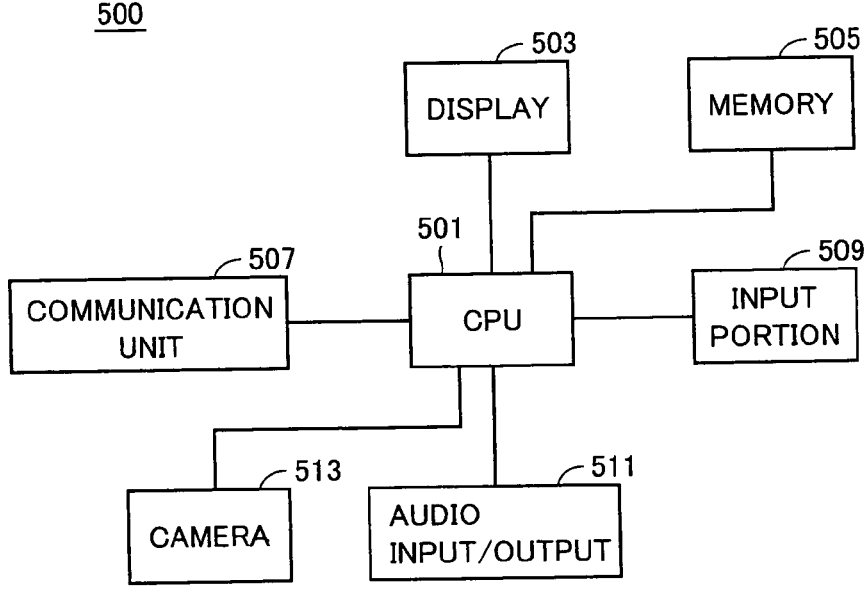
FIG. 5 shows a configuration of a portable terminal 500.

FIG. 5 shows a configuration of portable terminal 500.

Referring to FIG. 5, portable terminal 500 includes a CPU 501 for overall control of the apparatus, a display 503 attaining a function to display a Web page, a memory 505 recording a program or a constant, a communication unit 507 that can be connected to a network and carries out infrared communication or Bluetooth™ communication, an input portion 509 accepting an input from the user, an audio input/output unit 511 for input/output of voice/sound, and a camera 513 picturing and receiving an image.

Figure 6:
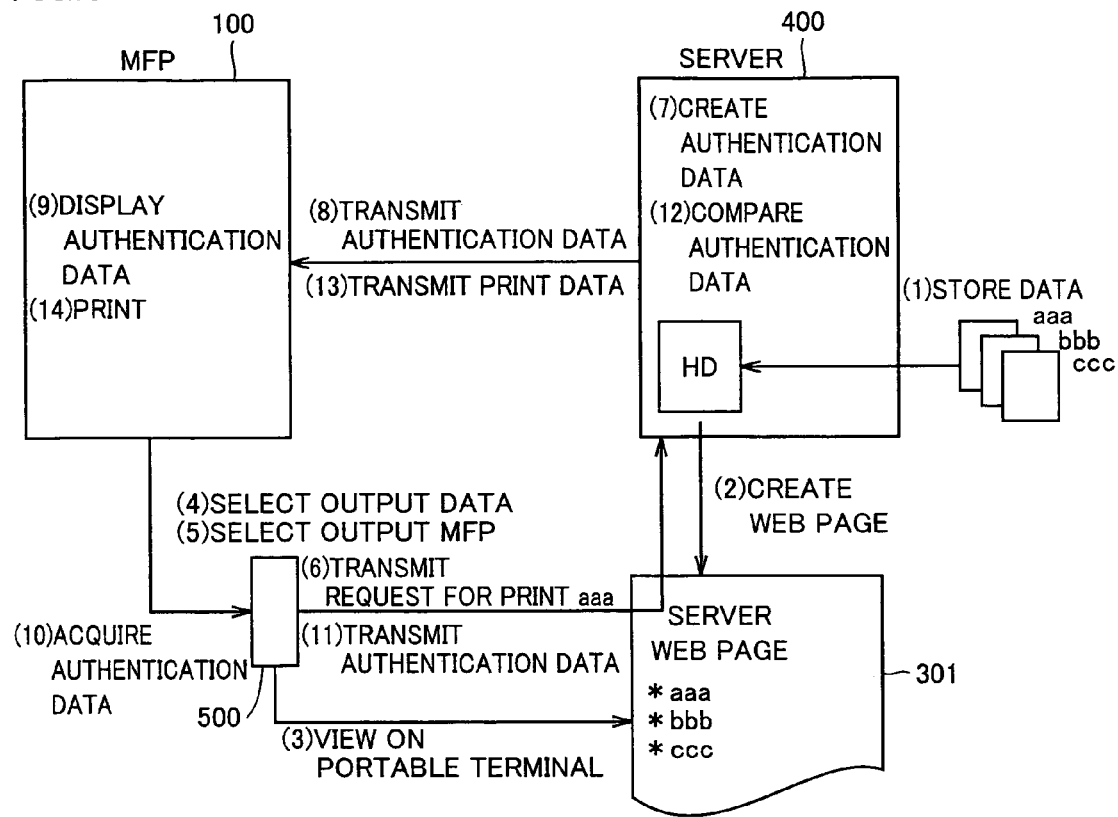
FIG. 6 illustrates data transmission/reception carried out among MFP 100, server 400, and portable terminal 500.

FIG. 6 illustrates data transmission/reception carried out among MFP 100, server 400, and portable terminal 500. Such a process is executed by the CPU in each apparatus in accordance with a control program installed in each component.

In the following, processes executed in each component will be described in chronological order, in connection with the numbers (1) to (14) in the drawing.

(1) Data is stored in advance in hard disk drive 615 within server 400 (data aaa, bbb, ccc).

(2) Web page creation unit 213 in server 400 creates a WEB page 301 listing the data in server 400.

(3) The user of portable terminal 500 views the Web page on portable terminal 500.

(4) The user of portable terminal 500 selects output data by means of portable terminal 500, and inputs his/her selection through input portion 509.

(5) The user of portable terminal 500 selects an MFP from which the data is to be printed out by means of portable terminal 500. Here, any of the following methods is adopted for selection.

(a) A unique pattern (such as a bar code) or an IP address is allocated in advance to each of MFPs 100a, 100b. The user of portable terminal 500 goes to the MFP from which print out is to be performed, in order to acquire the pattern or the IP address into the portable terminal through infrared communication, Bluetooth™, picture taking by a camera, or the like. The pattern or the IP address is transmitted from portable terminal 500 to server 400, and analyzed by server 400 so as to specify an MFP from which data is to be output.

(b) A data view Web page is prepared in server 400, a list of MFPs (and printers) available for print out is displayed on portable terminal 500, and a user input specifying an MFP from which print out is to be performed is accepted.

(6) A print request is transmitted from portable terminal 500 to server 400. Such transmission is automatically performed when the MFP from which print out is to be performed is selected in section (5) after the output data is selected in section (4) above. Therefore, the user does not need to be conscious in providing an input.

(7) Server 400 creates authentication data. The authentication data created here is unique, for which a string of numbers or a pattern may be used.

(8) Server 400 transmits the authentication data to MFP 100.

(9) Upon receiving the authentication data, MFP 100 displays the authentication data so as to notify the user of reception of the authentication data.

(10) Portable terminal 500 acquires the authentication data from MFP 100. Here, it is assumed that the data is acquired through infrared communication, Bluetooth™, picture taking by means of camera, or the like.

(11) Portable terminal 500 transmits the acquired authentication data to server 400.

(12) Server 400 compares the created authentication data with the data transmitted from the portable terminal.

(13) If the created authentication data is identical to the data transmitted from the portable terminal as a result of comparison, server 400 starts transmission to MFP 100 of print data corresponding to the authentication data.

(14) Printing is performed by MFP 100.

The system may be configured in such a manner that an ID of the portable terminal is transmitted to the server, so that print data is not transmitted unless the ID of the portable terminal that has transmitted a print request matches the ID of the portable terminal that has transmitted the authentication data.

Figure 7:
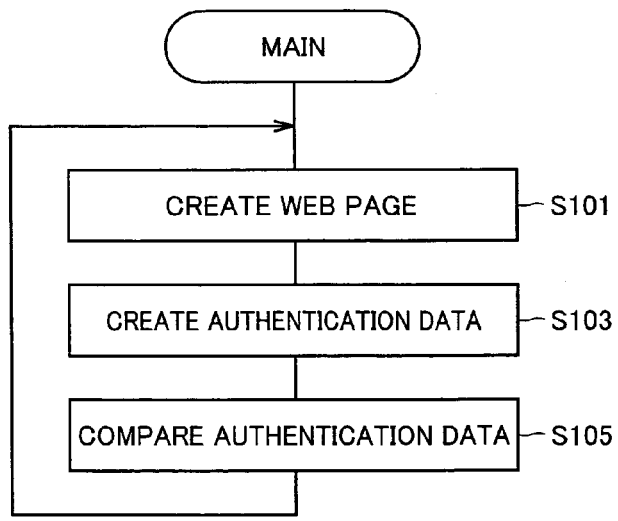
FIG. 7 is a flowchart showing an operation of server 400.

FIG. 7 is a flowchart showing an operation of server 400.

Referring to FIG. 7, every time the data is stored at step S101, a Web page showing a list of the data is created (or updated). A process at step S103 is such that authentication data is created in response to the print request from portable terminal 500, followed by transmission of the same to the designated MFP.

At step S105, when the authentication data arrives from portable terminal 500, the authentication data is compared with the stored authentication data. The processes from step S101 to step S103 are repeated.

Figure 8:
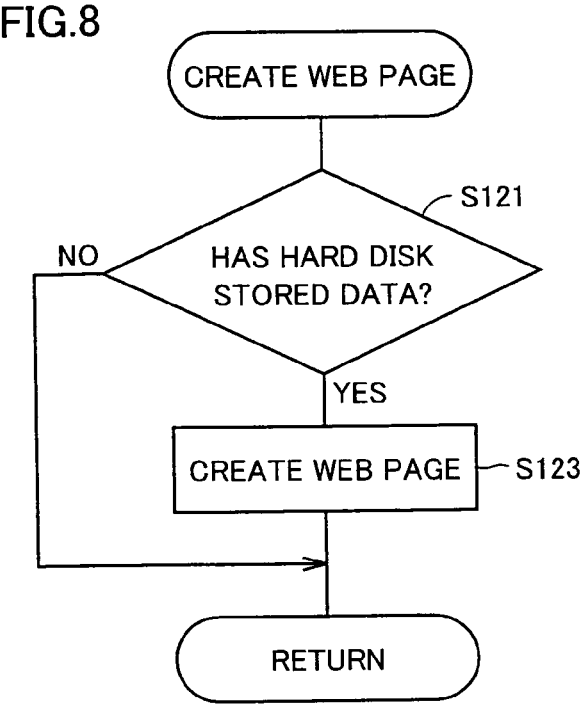
FIG. 8 is a flowchart showing a Web page creation process in FIG. 7.

FIG. 8 is a flowchart showing a Web page creation process in FIG. 7.

Referring to FIG. 8, at step S121, whether or not new data has been stored in the hard disk is determined. If YES, a Web page written with HTML for showing a list of the data stored in the hard disk is created at step S123.

If NO at step S121, the process returns to a main flow.

Figure 9:
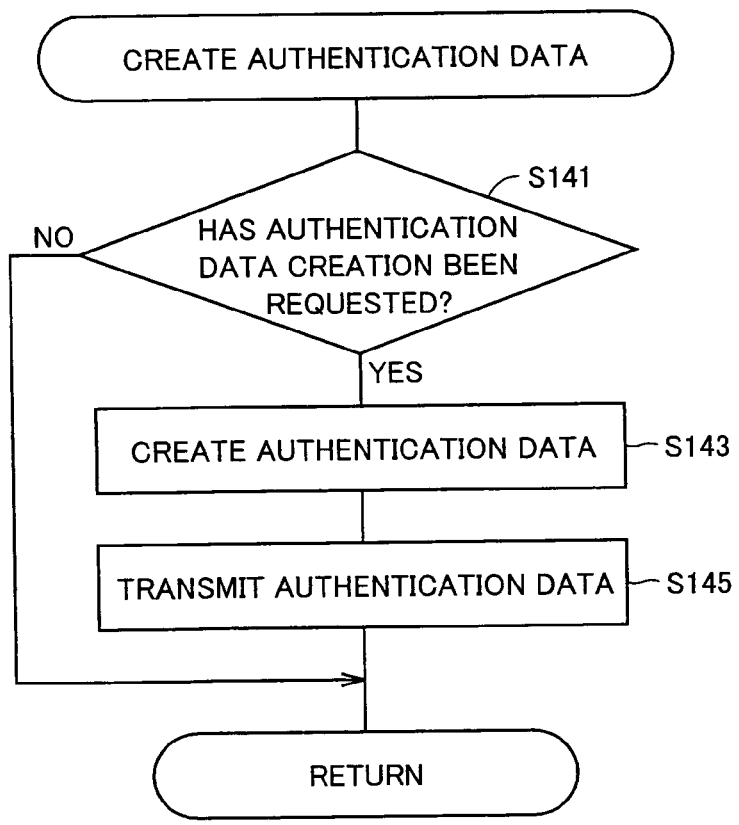
FIG. 9 is a flowchart showing an authentication data creation process in FIG. 7.

FIG. 9 is a flowchart showing an authentication data creation process in FIG. 7.

Referring to FIG. 9, whether or not authentication data creation has been requested is determined at step S141. If YES, the authentication data is created at step S143. At step S145, the created authentication data is transmitted to the MFP from which print out is to be performed, and the process returns to the main flow. If NO, the process simply returns to the main flow. The authentication data is implemented by a unique character string, a sequence of numbers, a pattern, or the like.

Figure 10:
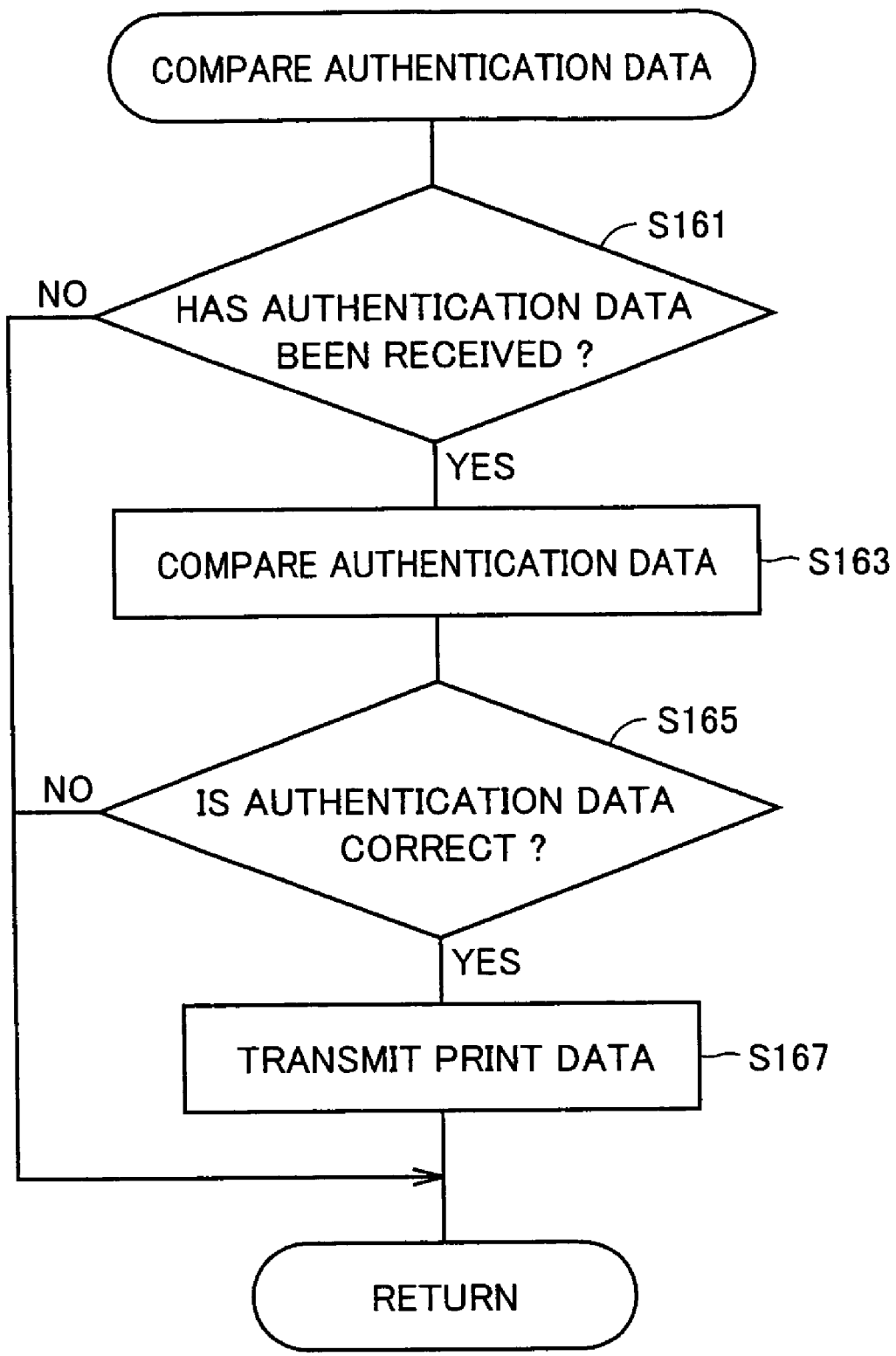
FIG. 10 is a flowchart showing an authentication data comparison process in FIG. 7.

FIG. 10 is a flowchart showing an authentication data comparison process in FIG. 7.

Referring to FIG. 10, whether or not authentication data has been received is determined at step S161. If YES, the received authentication data is compared with the created data at step S163. If it is determined at step S165 that the received authentication data is identical to the created data, the print data is transmitted to the MFP from which print out is to be performed at step S167. If the received authentication data is not identical to the created data, the process returns to the main flow.

If the authentication data has not yet been received, the process returns to the main flow.

When data of an image pictured by the camera is transmitted as the authentication data, the server analyzes the image data for comparison. As the server performs an analysis process as described above, the portable terminal does not have to attain an analysis function. This is also the case when information on the MFP from which print out is to be performed is transmitted as the image data.

Here, if a result of comparison of the authentication data does not show match, such a job may be discarded.

Figure 11:
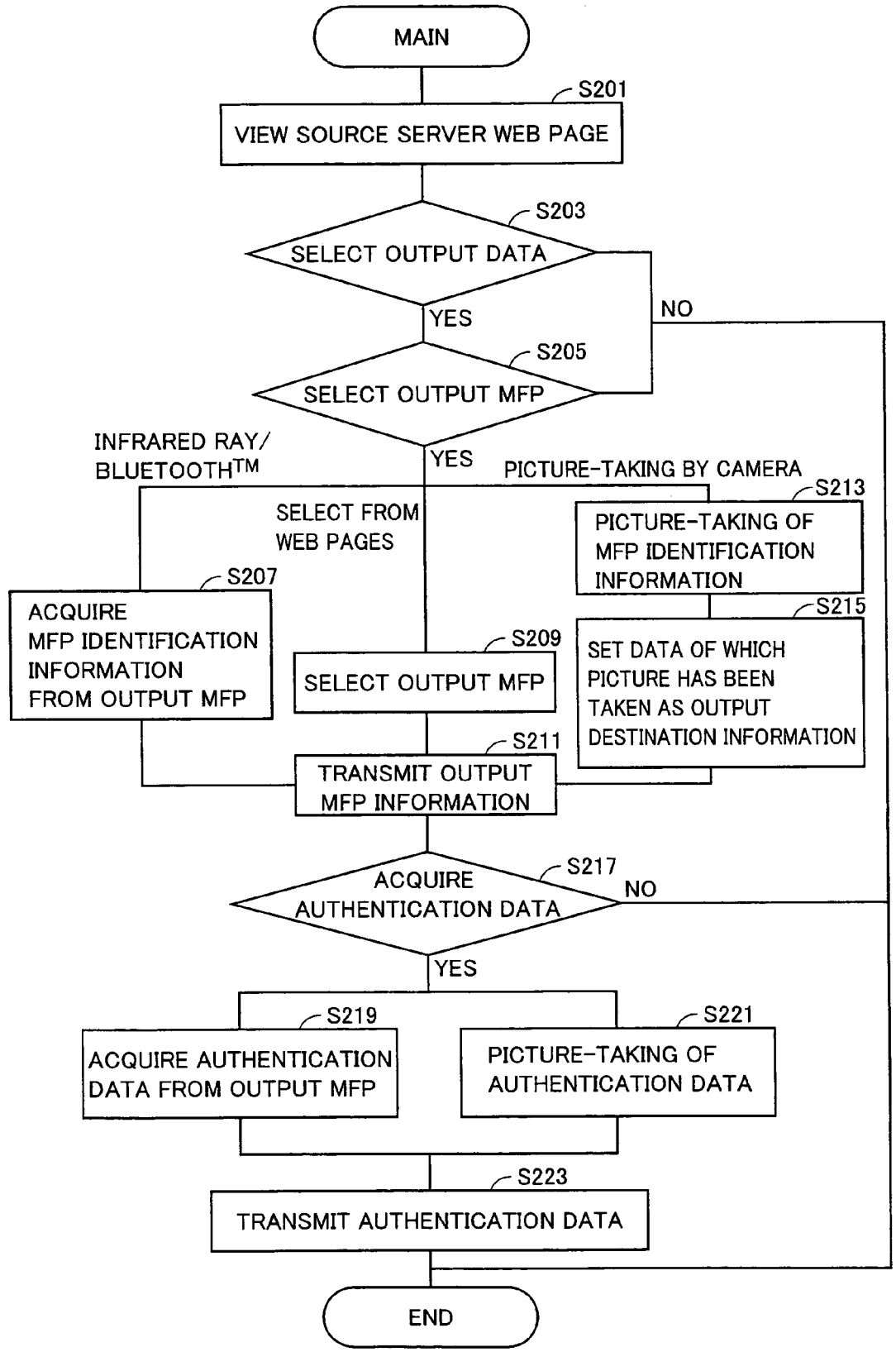
FIG. 11 is a flowchart showing a process performed by a portable terminal.

FIG. 11 is a flowchart showing a process performed by a portable terminal.

Referring to FIG. 11, a process for viewing a Web page created by server 400 is performed at step S201.

At step S203, selection of data desired to be output (input of data identification information) is accepted from the user. At step S205, selection of the MFP (or printer) from which print out is to be performed is received from the user.

At steps S207 to S215, the MFP from which print out is to be performed is selected.

At step S207, selection of the MFP is received through infrared communication or Bluetooth™ communication. That is, a code specifying the MFP is recorded in advance in a storage unit in the MFP, and the code is acquired through communication.

At step S209, selection of the MFP is received from a Web page. That is, selection is received from a page showing a list of output printers (MFPs), which page is linked to an output data viewing page displayed at step S201.

At steps S213 and S215, MFP selection is received through picture taking by means of the camera. That is, in order to specify an MFP from which print out is desired by the user, the camera picks up an image of a mark, a numeric value, a bar code, or the like provided to the MFP (the mark or the like may be attached to the MFP as a sticker, or may be displayed on operation panel 113 based on key input by the user). After the output data is selected at step S203, portable terminal 500 may automatically make a transition to a camera image pick-up mode (image pick-up preparation process). In addition, portable terminal 500 may also make a transition to a transmission mode at the time of image pick-up. When an image is picked up under the transmission mode, data thereof may be transmitted to a destination (a server, in this case) that has concurrently been identified.

In addition, concurrently with picture taking of the MFP which is a destination, its image may automatically be transmitted to server 400.

When picture taking by means of the camera is carried out at step S213, the data obtained as a result of picture taking is set as information indicating the destination of the print data at step S215.

Information for specifying the MFP from which print out is to be performed is automatically transmitted to server 400 at step S211.

Acquiring the authentication data from the MFP by portable terminal 500 at step S217 is carried out through infrared rays or Bluetooth™ at step S219 or picture taking by means of the camera at step S221.

In acquiring authentication data through infrared rays or Bluetooth™, the authentication data that has been recorded in the storage unit of the MFP is acquired through communication. Meanwhile, an image of the authentication data (such as a mark, a numeric value, a bar code, or the like) displayed on operation panel 113 of the MFP is picked up by the camera in order to acquire authentication data through picture taking by means of the camera.

The acquired authentication data is transmitted to server 400 at step S223.

By acquiring the authentication data through picture taking or through communication over a short range, presence of the user in front of the MFP can be identified, and the server can determine that it is allowed to transmit the data to the MFP.

Alternatively, transmission of the authentication data or the MFP information may be carried out through a cable.

Figure 12:
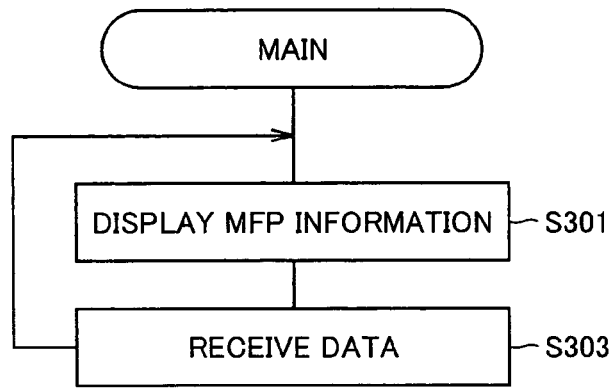
FIG. 12 is a flowchart showing a process performed by an MFP.

FIG. 12 is a flowchart showing a process performed by an MFP.

Referring to FIG. 12, whether or not display of the MFP information has been requested is determined at step S301. Here, the MFP information refers to information for specifying the MFP. A process for data reception is performed at step S303.

Figure 13:
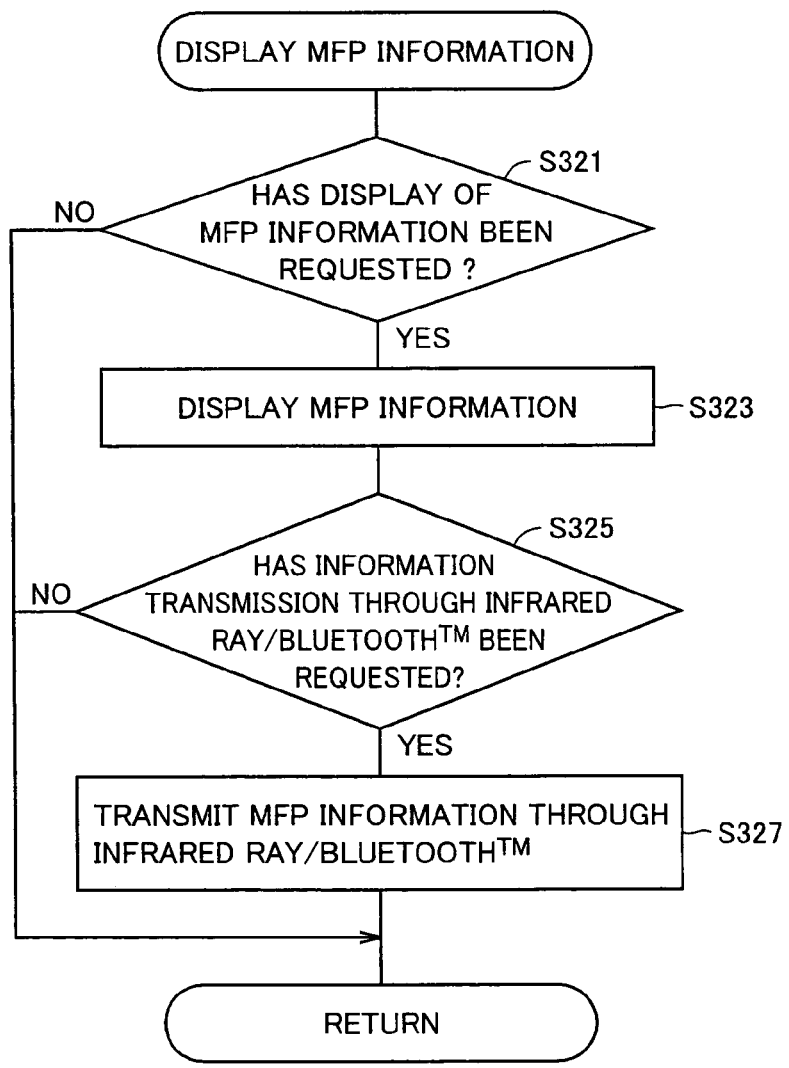
FIG. 13 is a flowchart showing an MFP information display process at step S301 in FIG. 12.

FIG. 13 is a flowchart showing an MFP information display process at step S301 in FIG. 12.

Whether or not the user has made an MFP information display request is determined at step S321. If YES, the MFP information is displayed on the panel at step S323. If NO, the process returns to the main flow.

At step S325, whether or not information transmission through the infrared rays or Bluetooth™ has been requested is determined. If YES, the MFP information is transmitted through the infrared rays or Bluetooth™ at step S327, and the process returns to the main flow FIG. 14 is a flowchart showing a data reception process at step S303 in FIG. 12.

Figure 14:
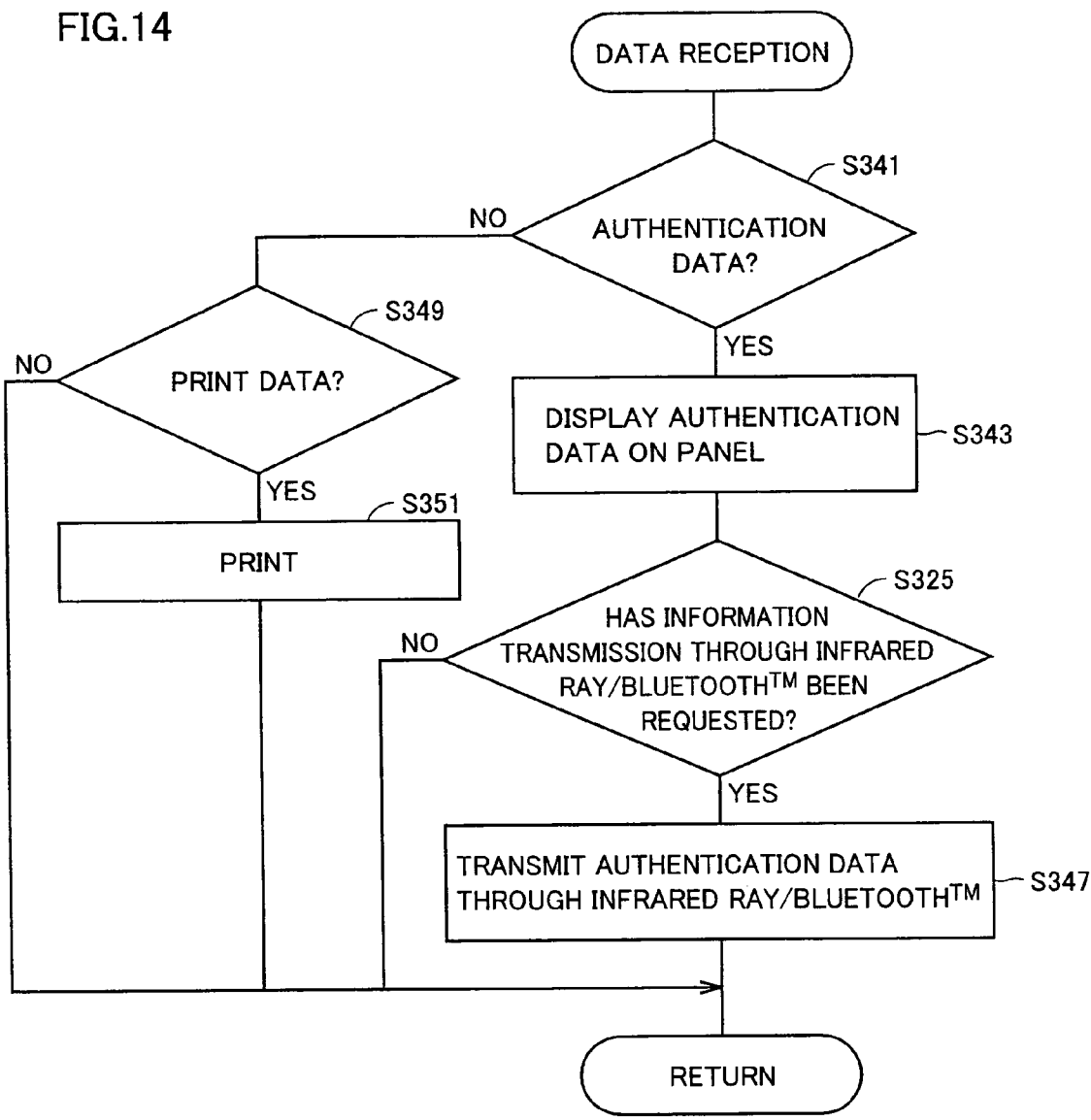
FIG. 14 is a flowchart showing a data reception process at step S303 in FIG. 12.

Referring to FIG. 14, whether or not the authentication data has been received from server 400 is determined at step S341. If YES, the authentication data is displayed on the operation panel at step S343 so as to notify the user of reception of the authentication data.

Thereafter, if transmission of the authentication data through the infrared rays or Bluetooth™ is requested at step S325, the authentication data is transmitted using the infrared rays or Bluetooth™ at step S347.

If the received data is not the authentication data, whether or not the received data is the print data is determined at step S349. If the received data is the print data, printing is started at step S351.

Figure 15:
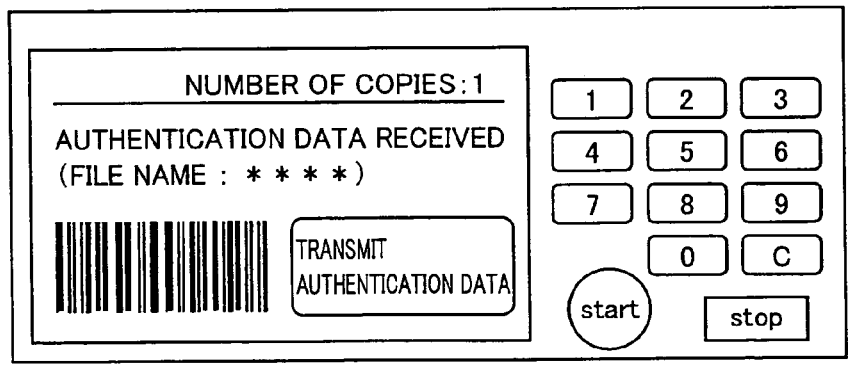
FIG. 15 shows a specific example of authentication data displayed on an operation panel at step S343 in FIG. 14.

FIG. 15 shows a specific example of the authentication data displayed on the operation panel at step S343 in FIG. 14.

In receiving the authentication data, a screen as shown in FIG. 15 is displayed on the MFP. Here, if the user presses an "authentication data transmission" button, the authentication data can be acquired by portable terminal 500 using infrared or Bluetooth™ communication.

If the screen shown in FIG. 15 is left as it is for several seconds to several minutes, the screen returns to a default screen. When the "authentication data transmission" button is pressed, the screen returns to the default screen after completion of data transmission. Even after the screen has returned to the default screen, the authentication data is temporarily stored in the RAM, and may be displayed as desired. When the MFP is re-started, the authentication data is erased. In order to display data at a desired time, a button for that purpose may be provided in the default screen.

[Miscellaneous]

It is noted that the MFP may also serve as the server.

In addition, concurrently with input of retrieval conditions from the portable terminal, the data in the server may be retrieved so as to specify the print data.

A picked up image is transmitted from portable terminal 500 to the server, in which image analysis is performed so as to specify the MFP and the authentication data, thereby effectively obviating the need for a special application in the portable terminal. Meanwhile, image analysis may be performed in the portable terminal.

It is noted that an IP address or the like may be sent from portable terminal 500 to server 400 as information for specifying the MFP from which the data is desirably output.

In addition, the MFP may be configured in such a manner that the authentication data stored in the RAM or the like may be erased after a prescribed time has passed.

Moreover, the MFP may be configured in such a manner that the authentication data stored in the RAM or the like may be erased by an instruction from the user.

Transmission of the data to the MFP may be carried out via an e-mail or by designating an IP address. In addition, the user may select a transmission method.

A program for executing the process shown in the flowcharts in the embodiment above may be provided, which may be recorded on a recording medium such as a CD-ROM, a flexible disc, a hard disk, an ROM, an RAM, a memory card, or the like, for use by the user. The program may be downloaded to the apparatus through a communication line such as the internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data output system, comprising:
a portable terminal that can be carried by a user;
a data output apparatus capable of storing data and transmitting the data external to said apparatus; and
a data print apparatus capable of printing data; wherein
said portable terminal includes
a selector selecting desired data among data stored in said data output apparatus as well as a data print apparatus for printing the desired data, and
a selection result transmitter transmitting a selection result to said data output apparatus,
said data output apparatus includes an authentication data transmitter transmitting authentication data to the selected data print apparatus based on the selection result transmitted from said selection result transmitter in said portable terminal,
said data print apparatus includes a display displaying the authentication data transmitted from the authentication data transmitter in said data output apparatus,
said portable terminal further includes
an acquirer acquiring the authentication data displayed on the display of said data print apparatus via a picture taking operation, and
an authentication data transmitter transmitting said acquired authentication data to said data output apparatus,
said data output apparatus includes a comparison unit comparing said authentication data transmitted from the authentication data transmitter in said portable terminal with the authentication data transmitted from the authentication data transmitter in said data output apparatus,
a data transmitter transmitting the data selected by said portable terminal to said data print apparatus if a result of a comparison by said comparison unit shows a match, and said data print apparatus further includes a print unit printing the data transmitted from said data transmitter in said data output apparatus.

2. The data output system according to claim 1, wherein said selector in said portable terminal selects a data print apparatus by photographing identification information associated with the data print apparatus.

3. The data output system according to claim 1, wherein said
data output apparatus further includes a creation unit creating a list of stored data, and
said selector in said portable terminal selects desired data from said list.

4. The data output system according to claim 3, wherein said creation unit creates the list at a time point when data is stored.

5. A data output apparatus capable of transmitting stored data external to said apparatus, comprising:
a storage unit storing data;
a selection result receiver receiving a selection result transmitted from a portable terminal, for selecting desired data among the data stored in said storage unit and a data print apparatus for printing the desired data;
an authentication data transmitter transmitting authentication data to the selected data print apparatus based on said received selection result;
a comparison unit comparing authentication data represented by image data obtained by photographing displayed authentication data using said portable terminal, which has been transmitted from said portable terminal based on transmission by said authentication data transmitter, with the authentication data transmitted by said authentication data transmitter; and
a data transmitter transmitting the data selected by said portable terminal to said selected data print apparatus if a result of a comparison by said comparison unit shows a match.

6. The data output apparatus according to claim 5, wherein said selection result transmitted from said portable terminal for selecting said data print apparatus is image data obtained by photographing identification information associated with the data print apparatus for printing data.

7. The data output apparatus according to claim 5, further comprising an analyzer analyzing the image data obtained by photography by means of said portable terminal.

8. The data output apparatus according to claim 5, further comprising a creation unit creating a list of stored data, wherein
said portable terminal selects desired data from said list.

9. The data output apparatus according to claim 8, wherein said creation unit creates the list at a time point when data is stored.

10. A computer readable medium containing a control program for a data output apparatus capable of transmitting stored data external to said apparatus, causing a computer to execute the steps of:
storing data;
receiving a selection result transmitted from a portable terminal, for selecting desired data among the data stored in said step of storing and a data print apparatus for printing the desired data;
transmitting authentication data to the selected data print apparatus based on said received selection result;
comparing authentication data represented by image data obtained by photographing displayed authentication data using said portable terminal, which has been transmitted from said portable terminal in said step of transmitting authentication data, with the authentication data transmitted in said step of transmitting authentication data; and
transmitting the data selected by said portable terminal to said selected data print apparatus if a comparison result in said step of comparing shows a match.

11. The computer readable medium according to claim 10, wherein
said selection result transmitted from said portable terminal for selecting said data print apparatus is image data obtained by photographing at least identification information associated with the data print apparatus for printing data.

12. The computer readable medium according to claim 10, wherein said program further causes the computer to execute the step of analyzing the image data obtained by photography by means of said portable terminal.

13. The computer readable medium according to claim 10, wherein said program further causes the computer to execute the step of creating a list of stored data, wherein said portable terminal selects desired data from said list.

14. The computer readable medium according to claim 13, wherein in said step of creating, the list is created at a time point when data is stored.

15. A data output method capable of transmitting stored data external to an apparatus in which said data is stored, comprising the steps of:
storing data;
receiving a selection result transmitted from a portable terminal, for selecting desired data among the data stored in said step of storing and a data print apparatus for printing the desired data;
transmitting authentication data to the selected data print apparatus based on said received selection result;
comparing authentication data represented by image data obtained by photographing displayed authentication data using said portable terminal, which has been transmitted from said portable terminal in said step of transmitting authentication data, with the authentication data transmitted in said step of transmitting authentication data; and
transmitting the data selected by said portable terminal to said selected data print apparatus if a comparison result in said step of comparing shows a match.

16. The data output method according to claim 15, wherein said selection result transmitted from said portable terminal for selecting said data print apparatus is image data obtained by photographing at least identification information associated with the data print apparatus for printing data.

17. The data output method according to claim 15, further comprising the step of analyzing the image data obtained by photographing by means of said portable terminal.

18. The data output method according to claim 15, further comprising the step of creating a list of stored data, wherein said portable terminal selects desired data from said list.

19. The data output method according to claim 18, wherein in said step of creating, the list is created at a time point when data is stored.

20. The data output system according to claim 1, wherein the authentication data comprises a string of numbers or a pattern, and
wherein the result of the comparison by said comparison unit shows a match if said authentication data transmitted from the authentication data transmitter in said portable terminal and the authentication data transmitted from the authentication data transmitter in said data output apparatus are identical.

21. The data output system according to claim 5, wherein the authentication data comprises a string of numbers or a pattern, and wherein the result of the comparison by said comparison unit shows a match if the authentication data represented by the image data obtained by photographing displayed authentication data using said portable terminal, which has been transmitted from said portable terminal based on transmission by said authentication data transmitter, and the authentication data transmitted by said authentication data transmitter are identical.

22. The computer readable medium according to claim 10, wherein the authentication data comprises a string of numbers or a pattern, and wherein the comparison result in said step of comparing shows a match if the authentication data represented by the image data obtained by photographing displayed authentication data using said portable terminal, which has been transmitted from said portable terminal in said step of transmitting authentication data, and the authentication data transmitted in said step of transmitting authentication data are identical.

23. The data output method according to claim 15, wherein the authentication data comprises a string of numbers or a pattern, and wherein the comparison result in said step of comparing shows a match if the authentication data represented by the image data obtained by photographing displayed authentication data using said portable terminal, which has been transmitted from said portable terminal in said step of transmitting authentication data, and the authentication data transmitted in said step of transmitting authentication data are identical.

* * * * *